United States Patent
Sakamoto et al.

(10) Patent No.: US 8,971,700 B2
(45) Date of Patent: Mar. 3, 2015

(54) BIDIRECTIONAL MONITOR MODULE, OPTICAL MODULE, OPTICAL ADD-DROP MULTIPLEXER, AND OPTICAL SYSTEM

(71) Applicant: Fujitsu Limited, Kawasaki-shi, Kanagawa (JP)

(72) Inventors: Takeshi Sakamoto, Kawasaki (JP); Norifumi Shukunami, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 13/850,551

(22) Filed: Mar. 26, 2013

(65) Prior Publication Data
US 2013/0330073 A1    Dec. 12, 2013

(30) Foreign Application Priority Data
Jun. 12, 2012 (JP) .................. 2012-132763

(51) Int. Cl.
*H04B 10/07* (2013.01)
*H04J 14/02* (2006.01)
*H04B 10/079* (2013.01)

(52) U.S. Cl.
CPC ............ *H04B 10/07* (2013.01); *H04J 14/0216* (2013.01); *H04B 10/07955* (2013.01); *H04J 14/0212* (2013.01); *H04J 14/0221* (2013.01); *H04J 14/0204* (2013.01); *H04J 14/0209* (2013.01); *H04J 14/0217* (2013.01)
USPC .......................................................... 398/20

(58) Field of Classification Search
CPC ............ H04B 10/2503; H04B 10/0795; H04B 10/07953; H04B 10/07955; H04B 10/07957; H04J 14/0204; H04J 14/0209; H04J 14/0212; H04J 14/0217; H04J 14/0221
USPC ....................................................... 398/17, 20
See application file for complete search history.

(56) References Cited

U.S. PATENT DOCUMENTS

| | | | | |
|---|---|---|---|---|
| 6,018,404 | A | * | 1/2000 | Meli et al. .......................... 398/1 |
| 7,171,070 | B1 | * | 1/2007 | Birk et al. ........................ 385/24 |
| 7,187,861 | B2 | * | 3/2007 | Ruchet ................................ 398/9 |
| 2005/0036444 | A1 | * | 2/2005 | Park et al. ...................... 370/222 |
| 2012/0002964 | A1 | | 1/2012 | Takatsu et al. |

FOREIGN PATENT DOCUMENTS

JP    2012-15726    1/2012

* cited by examiner

*Primary Examiner* — Leslie Pascal
(74) *Attorney, Agent, or Firm* — Staas & Halsey LLP (57) ABSTRACT

A bidirectional monitor module includes a 2×2 optical coupler configured to output input light that is input from a first port to a second port and drop the input light input from the first port to a third port and also output input light that is input from the second port to the first port and drop the input light input from the second port to a fourth port; an optical output unit configured to output one of light that is dropped and output from the third port and light that is dropped and output from the fourth port; and a monitor unit configured to monitor optical power of the light output from the optical output unit.

8 Claims, 10 Drawing Sheets

BIDIRECTIONAL MONITOR MODULE, OPTICAL MODULE, OPTICAL ADD-DROP MULTIPLEXER, AND OPTICAL SYSTEM

CROSS-REFERENCE TO RELATED APPLICATION

This application is based upon and claims the benefit of priority of the prior Japanese Patent Application No. 2012-132763, filed on Jun. 12, 2012, the entire contents of which are incorporated herein by reference.

FIELD

The embodiments discussed herein are related to a bidirectional monitor module, an optical module, an optical add-drop multiplexer, and an optical system.

BACKGROUND

In recent years, while communication demands based on a spread of the internet and the like are increased, a wavelength division multiplexing (WDM) system utilizing broadband characteristics of optical amplifiers is being widely used.

All or part of optical nodes are provided with an optical add-drop multiplexer (OADM) in the WDM system. The optical add-drop multiplexer can add an optical signal to an optical transmission line in units of wavelength and take out the optical signal from the optical transmission line in units of wavelength.

The optical add-drop multiplexer is provided with a function of adding an optical signal having a desired wavelength to a WDM optical signal (optical add function) and a function of dropping the optical signal having the desired wavelength from the WDM optical signal (optical drop function). The optical add-drop multiplexer that adds and/or drops the optical signal having the desirable wavelength may be referred to as ROADM (Reconfigurable OADM).

The optical add-drop multiplexer preferably has a CDC (Colorless, Directionless, and Contentionless) function so that it is possible to flexibly set or modify a wavelength path.

Colorless represents a configuration or a function with which an arbitrary wavelength can be input to an arbitrary port of the optical add-drop multiplexer, and an arbitrary wavelength can be output from an arbitrary port. Directionless represents a configuration or a function with which optical signals from respective terminal stations can be guided to arbitrary routes, and the optical signals from the respective arbitrary routes can be guided to arbitrary terminal stations in a configuration where the optical add-drop multiplexer includes plural routes. Contentionless represents a configuration or a function with which a collision of optical signals having a same wavelength is avoided in the optical add-drop multiplexer.

Japanese Laid-open Patent Publication No. 2012-015726 discloses an example of the optical add-drop multiplexer having the CDC function, for example.

Manufacturing costs for the optical add-drop multiplexer are preferably low. In addition to the optical add-drop multiplexer, manufacturing costs for various types of optical modules, an optical apparatus, an optical system, and the like are preferably as low as possible.

However, as the number of optical devices (optical elements, for example) included in the optical add-drop multiplexer, the various types of optical modules, the optical system, and the like is higher, the manufacturing costs are generally higher. As the number of relatively expensive optical devices such as an optical channel monitor (OCM) is higher, the manufacturing costs are higher. If more types of optical modules included in the optical add-drop multiplexer, the optical system, and the like are used, the manufacturing costs are higher.

SUMMARY

According to an aspect of the embodiments, a bidirectional monitor module includes a 2×2 optical coupler configured to output input light that is input from a first port to a second port and drop the input light input from the first port to a third port and also output input light that is input from the second port to the first port and drop the input light input from the second port to a fourth port; an optical output unit configured to output one of light that is dropped and output from the third port and light that is dropped and output from the fourth port; and a monitor unit configured to monitor optical power of the light output from the optical output unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of the present disclosure will be described with reference to the drawings. It is noted that the following embodiment is merely an exemplification and is not intended to exclude various modifications and technical applications that are not explicit in the following embodiment and respective modified examples. That is, the following embodiment and respective modified examples can be realized through various modifications without departing from the gist of the present disclosure.

Figure 1A:
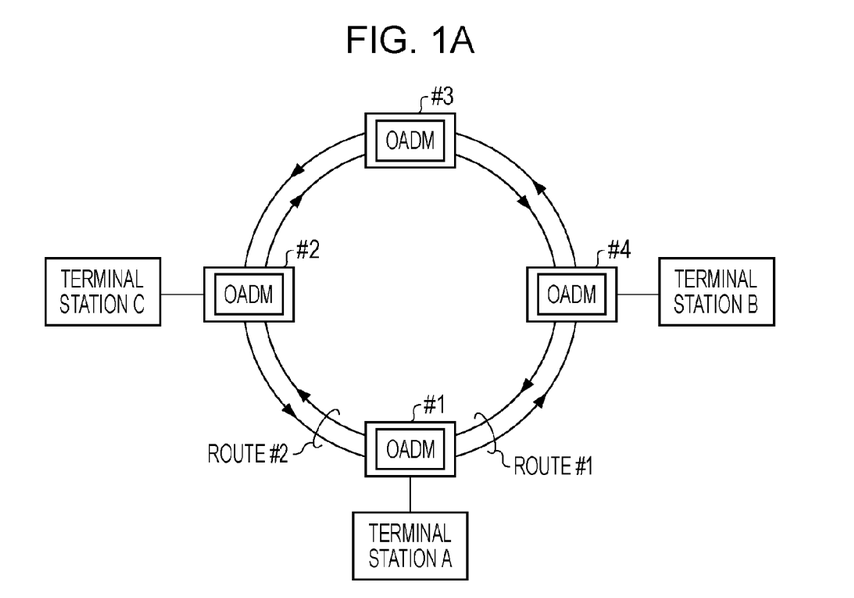
FIG. 1A and FIG. 1B illustrate configuration examples of an optical system.
Figure 1B:
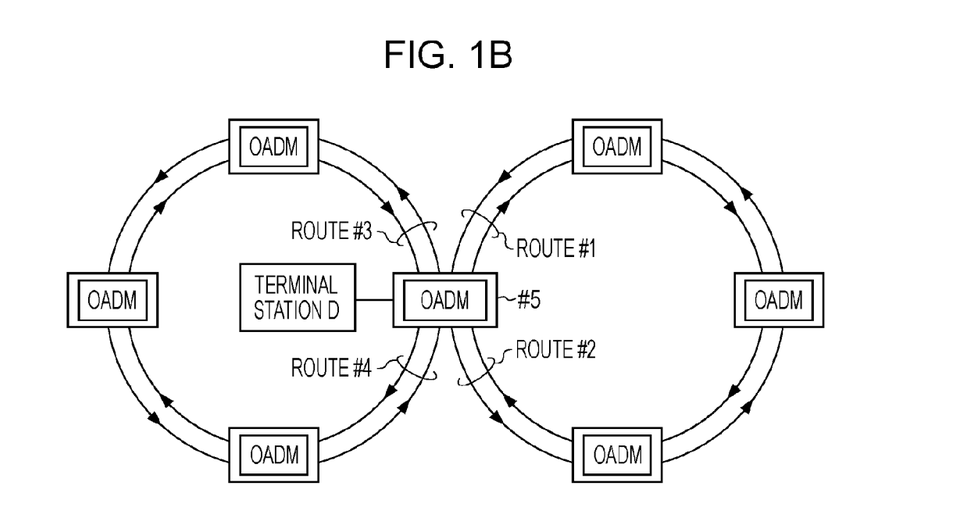

FIG. 1A and FIG. 1B illustrate configuration examples of an optical system according to an embodiment. An optical add-drop multiplexer (OADM) is installed in an optical node. The optical add-drop multiplexer is provided with a function of adding a single or plural optical signals having desired wavelengths to a WDM optical signal (add function) and a function of dropping the single or plural optical signals having the desired wavelengths from the WDM optical signal (drop function).

The network system illustrated in FIG. 1A is a bidirectional ring network and includes four optical nodes #1 to #4. The respective optical nodes are connected by a pair of a clockwise optical transmission line and an anticlockwise optical transmission line. The clockwise optical transmission line and the anticlockwise optical transmission line respectively transmit WDM optical signals. Each of optical nodes #1 to #4 is provided with the optical add-drop multiplexer.

An optical transmission line extending in a certain direction is referred to as "route" while the respective optical nodes or the respective optical add-drop multiplexers are set as a reference. For example, the optical node #1 (or the optical add-drop multiplexer of the optical node #1) includes a route #1 and a route #2. The route #1 is connected to the optical node #4. The optical transmission line (incoming route) for transmitting the WDM optical signal from the optical node #4 to the optical node #1 and the optical transmission line (outgoing route) for transmitting the WDM optical signal from the optical node #1 to the optical node #4 are set on the route #1. The route #2 is connected to the optical node #2. The optical transmission line (incoming route) for transmitting the WDM optical signal from the optical node #2 to the optical node #1 and the optical transmission line (outgoing route) for transmitting the WDM optical signal from the optical node #1 to the optical node #2 are set on the route #2.

In the thus structured network system, for example, when data is sent from a terminal station A to a terminal station B, the optical node #1 outputs an optical signal sent from the terminal station A to the route #1. The terminal station A sends, for example, an optical signal for carrying data by utilizing a wavelength λ1 at this time. The optical add-drop multiplexer of the optical node #1 adds the optical signal sent from the terminal station A to the WDM optical signal transmitted from the optical node #2 to the optical node #4. The optical add-drop multiplexer of the optical node #4 drops the optical signal having the wavelength λ1 from the WDM optical signal to be guided to the terminal station B. The data sent from the terminal station A is thus received by the terminal station B.

When data is sent from a terminal station C to the terminal station A, the terminal station C sends, for example, an optical signal for carrying data by utilizing a wavelength λ2. The optical add-drop multiplexer of the optical node #2 adds the optical signal sent from the terminal station C to the WDM optical signal transmitted from the optical node #3 to the optical node #1. This WDM optical signal is input from the route #2 to the optical node #1. The optical add-drop multiplexer of the optical node #1 drops the optical signal having the wavelength λ2 from the WDM optical signal to be guided to the terminal station A. The data sent from the terminal station C is thus received by the terminal station A.

In the network system illustrated in FIG. 1A, each of the optical add-drop multiplexers includes two routes. It is noted that the optical add-drop multiplexer according to the embodiment may include more routes. For example, in the network system illustrated in FIG. 1B, the optical add-drop multiplexer of the optical node #5 includes four routes #1 to #4. The optical add-drop multiplexer of the optical node #5 can output an optical signal having an arbitrary wavelength which is sent from a terminal station D to an arbitrary route at this time. The optical add-drop multiplexer of the optical node #5 can also drop an optical signal having an arbitrary wavelength from an arbitrary route to be transferred to the terminal station D.

The number of routes included in the optical add-drop multiplexer may be counted as "Degree". For example, the respective optical add-drop multiplexers illustrated in FIG. 1A include two routes and may be referred to as 2-degree optical add-drop multiplexers. The optical add-drop multiplexer of the optical node #5 illustrated in FIG. 1B includes four routes and may be referred to as 4-degree optical add-drop multiplexer.

Figure 2:
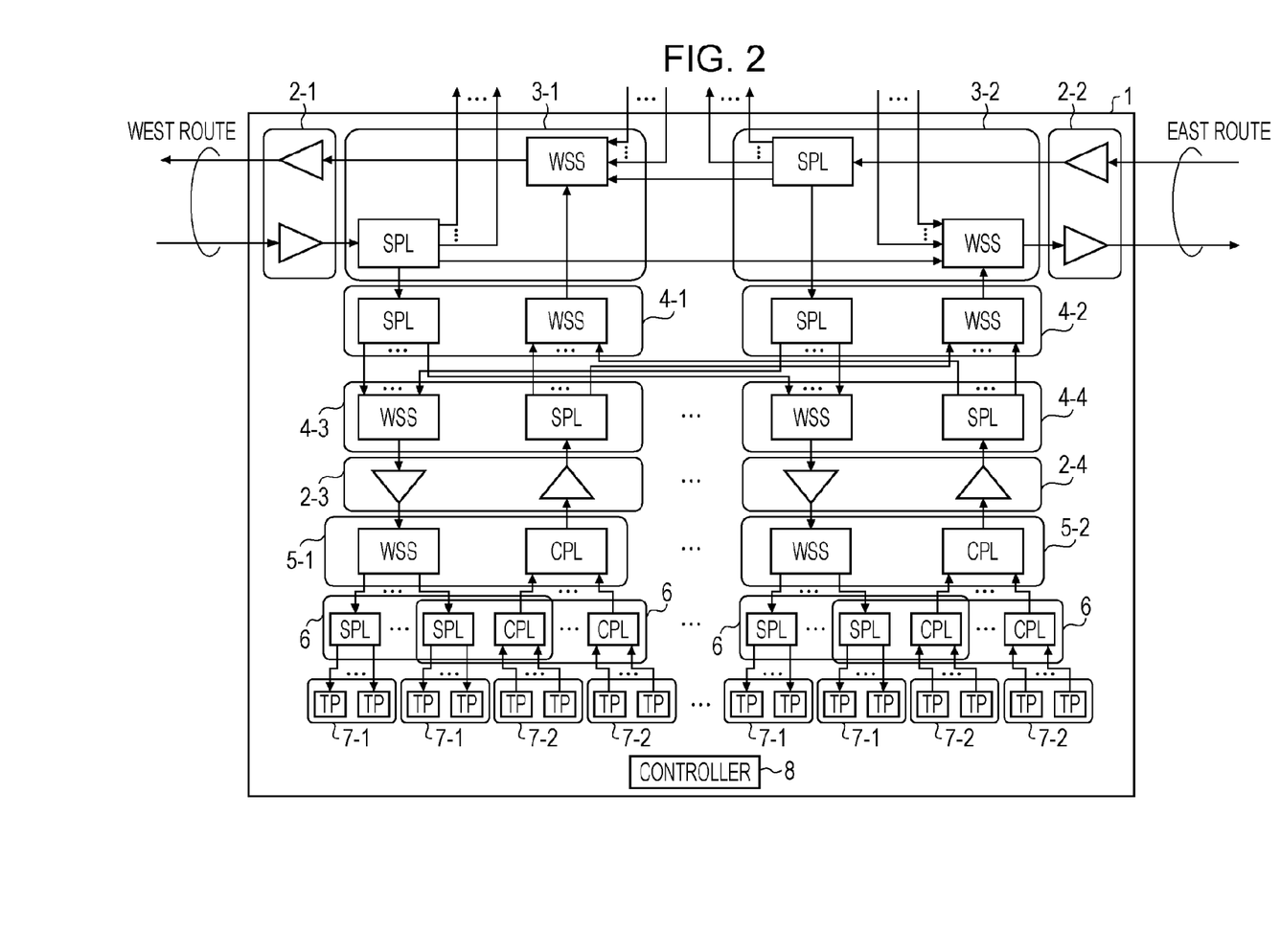
FIG. 2 illustrates a configuration example of an optical add-drop multiplexer.

FIG. 2 illustrates a configuration example of the optical add-drop multiplexer.

As exemplified in FIG. 2, an optical add-drop multiplexer 1 includes two routes (a WEST route and an EAST route). The WEST route includes a pair of an incoming route and an outgoing route. The EAST route similarly includes a pair of an incoming route and an outgoing route.

Optical modules (packages) 2-1 to 2-4, 3-1 and 3-2, 4-1 to 4-4, 5-1 and 5-2, 6, and 7-1 and 7-2 using a function block provided with plural optical devices (optical elements) as a single unit and a controller 8 that can control the respective optical modules 2-1 to 2-4, 3-1 and 3-2, 4-1 to 4-4, 5-1 and 5-2, 6, and 7-1 and 7-2 are mounted in the optical add-drop multiplexer 1 exemplified in FIG. 2.

In the example illustrated in FIG. 2, each of the optical modules 2-1 to 2-4 is provided with plural optical amplifiers, and the optical modules 3-1 and 3-2 and 4-1 to 4-4 are provided with a wavelength selective switch (WSS) and an optical splitter (SPL). The optical modules 5-1 and 5-2 are provided with the wavelength selective switch (WSS) and an optical coupler (CPL), and the optical module 6 is provided with a pair of the SPL and the CPL. Each of the optical modules 7-1 to 7-2 is provided with plural transponders (TP).

The optical module 2-1 including the optical amplifiers amplifies the WDM optical signal input from the WEST route and also amplifies the WDM optical signal output to the WEST route. The optical module 2-2 similarly amplifies the WDM optical signal input from the EAST route and also amplifies the WDM optical signal output to the EAST route. Gains of the optical amplifiers in the respective optical modules 2-1 and 2-2 may be calculated in advance or dynamically controlled.

When attention is paid on the drop function of the optical add-drop multiplexer 1, the SPL in the optical module 3-1 drops the WDM optical signal input from the WEST route to be guided to the WSS in the optical module 3-2, the SPL in the optical module 4-1, and the other plural routes. The SPL in the optical module 3-2 similarly drops the WDM optical signal input from the EAST route to be guided to the WSS in the optical module 3-1, the SPL in the optical module 4-2, and the other plural routes.

The SPL in the optical module 4-1 drops the WDM optical signal guided from the SPL in the optical module 3-1 to be guided to the WSS in the optical module 4-3, the WSS in the optical module 4-4, and the WSS in the similar optical module. The SPL in the optical module 4-2 similarly drops the WDM optical signal guided from the SPL in the optical module 3-2 to be guided to the WSS in the optical module 4-4, the WSS in the optical module 4-3, and the WSS in the similar optical module.

The WSS in the optical module 4-3 selects the optical signals having one or plural wavelengths specified by the controller 8 among the input optical signals. The WSS in the optical module 4-4 similarly selects the optical signals having one or plural wavelengths specified by the controller 8 among the input optical signals. The wavelengths selected by the WSS in the optical module 4-3 and the wavelengths selected by the WSS in the optical module 4-4 may be respectively different from each other, respectively identical to each other, or partially overlapped with each other.

One optical amplifier in the optical module 2-3 amplifies the optical signal selected by the WSS in the optical module 4-3, and one optical amplifier in the optical module 2-4 amplifies the optical signal selected by the WSS in the optical module 4-4.

The WSS in the optical module 5-1 guides the input optical signal to an output port specified by the controller 8. The WSS in the optical module 5-2 similarly guides the input optical signal to an output port specified by the controller 8.

The SPL in the optical module 6 drops the input optical signal to be guided to the TP in the optical module 7-1, and the TP in the optical module 7-1 transfers the input optical signal to a corresponding terminal station. The TP in the optical module 7-1 may convert the wavelength of the optical signal as appropriate at this time. The wavelengths of the optical signals output from the respective TPs in the optical modules 7-1 may be equal to each other or different from each other.

When attention is paid to the add function of the optical add-drop multiplexer 1, the TPs in the optical module 7-2 respectively transfer the optical signals sent from corresponding terminal stations to the CPLs in the optical modules 6. The TP in the optical module 7-2 may convert the wavelength of the optical signal as appropriate at this time. The wavelengths of the optical signals sent from the respective terminal stations may be equal to each other or different from each other. The wavelengths of the optical signal output from the respective TPs in the optical module 7-2 are not particularly limited but may be different from each other.

The CPLs in the respective optical modules 6 multiplex the optical signals input from the TPs in the respective optical modules 7-2 with each other to be guided to the CPLs in the optical modules 5-1 and 5-2.

The CPL in the optical module 5-1 multiplexes the optical signals input from the CPLs in the respective optical modules 6 with each other to be guided to the other optical amplifier in the optical module 2-3. The CPL in the optical module 5-2 similarly multiplexes the optical signals input from the CPLs in the respective optical modules 6 with each other to be guided to the other optical amplifier in the optical module 2-4.

The other optical amplifier in the optical module 2-3 amplifies the optical signal input by the CPL in the optical module 5-1 to be guided to the SPL in the optical module 4-3. The other optical amplifier in the optical module 2-4 similarly amplifies the optical signal input by the CPL in the optical module 5-2 to be guided to the SPL in the optical module 4-4.

The SPL in the optical module 4-3 drops the input optical signal to be guided to the WSS in the optical module 4-1, the WSS in the optical module 4-2, and the WSS in the similar optical module. The SPL in the optical module 4-4 similarly drops the input optical signal to be guided to the WSS in the optical module 4-2, the WSS in the optical module 4-1, and the WSS in the similar optical module.

The WSS in the optical module 4-1 selects the optical signals having one or plural wavelengths specified by the controller 8 among the input optical signals. The WSS in the optical module 4-2 similarly selects the optical signals having one or plural wavelengths specified by the controller 8 among the input optical signals.

The WSS in the optical module 3-1 generates a WDM optical signal to be output to the WEST route on the basis of the optical signal guided from the EAST route via the SPL in the optical module 3-2 and the optical signal guided from the WSS in the optical module 4-1 while following the control by the controller 8. The WSS in the optical module 3-1 selects one or plural arbitrary wavelengths to be "through" the optical add-drop multiplexer 1 from the optical signal guided from the EAST route via the SPL in the optical module 3-2 at this time. The WSS in the optical module 3-1 also selects one or plural arbitrary wavelengths to be "added" to the WDM optical signal from the optical signal guided from the WSS in the optical module 4-1.

The WSS in the optical module 3-2 similarly generates a WDM optical signal to be output to the EAST route on the basis of the optical signal guided from the WEST route via the SPL in the optical module 3-1 and the optical signal guided from the WSS in the optical module 4-2 while following the control by the controller 8. The WSS in the optical module 3-2 selects one or plural arbitrary wavelengths to be "through" the optical add-drop multiplexer 1 from the optical signal guided from the WEST route via the SPL in the optical module 3-1 at this time. The WSS in the optical module 3-2 also selects one or plural arbitrary wavelengths to be "added" to the WDM optical signal from the optical signal guided from the WSS in the optical module 4-2.

The controller 8 controls the respective optical devices in the respective optical modules 2-1 to 2-4, 3-1 and 3-2, 4-1 to 4-4, 5-1 and 5-2, 6, and 7-1 and 7-2 in accordance with an instruction from a user or a network management apparatus. For this reason, the controller 8 is provided, for example, with a processor and a memory. The memory may store a program describing an add operation and a drop operation of the optical add-drop multiplexer 1. In this case, the processor executes the program stored in the memory to provide the add operation and the drop operation for the optical signal. The controller 8 may provide an interface with the user or the network management apparatus.

Here, a consideration will be given of a reduction in types of the respective optical modules used in the optical add-drop multiplexer 1 because If the optical modules including the similar optical devices are designed to be commonly usable for diversion, it is possible to reduce the number of stocks of the optical modules, for example, and manufacturing costs for the optical add-drop multiplexer 1 can be decreased. In the following description, the optical modules 2-1 to 2-4 may simply be referred to as optical module 2. The optical modules 3-1 and 3-2 may simply be referred to as optical module 3. The optical modules 4-1 to 4-4 may simply be referred to as optical module 4. The optical modules 5-1 and 5-2 may simply be referred to as optical module 5. The optical modules 7-1 and 7-2 may simply be referred to as optical module 7.

For example, since the optical splitter (SPL) and the optical coupler (CPL) are practically the same optical devices, it may be found out that the optical modules 3 and 4 and the optical module 5 include almost the same configurations.

If the optical module 5 is diverted to the optical modules 3 and 4, the optical module 4 is diverted to the optical modules 3 and 5, or the optical module 5 is diverted to the optical modules 3 and 4, it is possible to reduce the types of the optical modules.

Figure 3A:
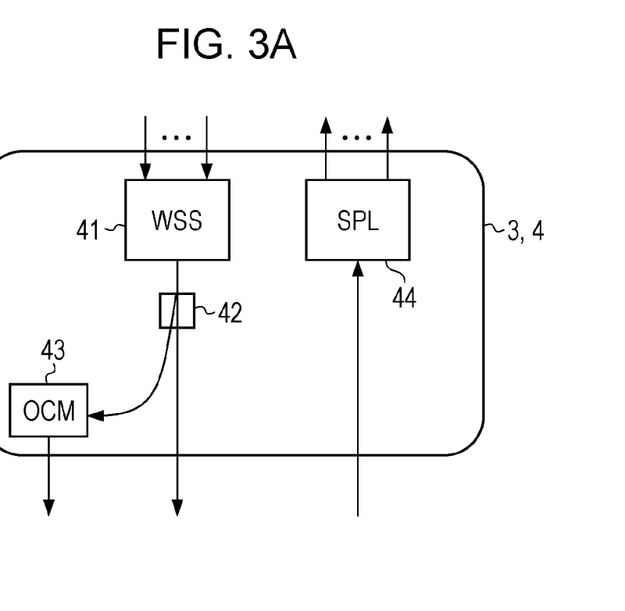
FIG. 3A and FIG. 3B illustrate configuration examples of an optical module.

However, in actuality, as exemplified in FIG. 3A, the optical modules 3 and 4 are structured by including a WSS 41, an SPL 44, a 1×2 optical coupler 42 that performs power dropping on the optical signal output from the WSS 41, and an OCM 43 that monitors the optical signal dropped by the 1×2 optical coupler 42. The controller is notified of a monitor result of the OCM 43, for example, and the monitor result may be used for the controls on the respective optical modules 2 to 7.

Figure 3B:
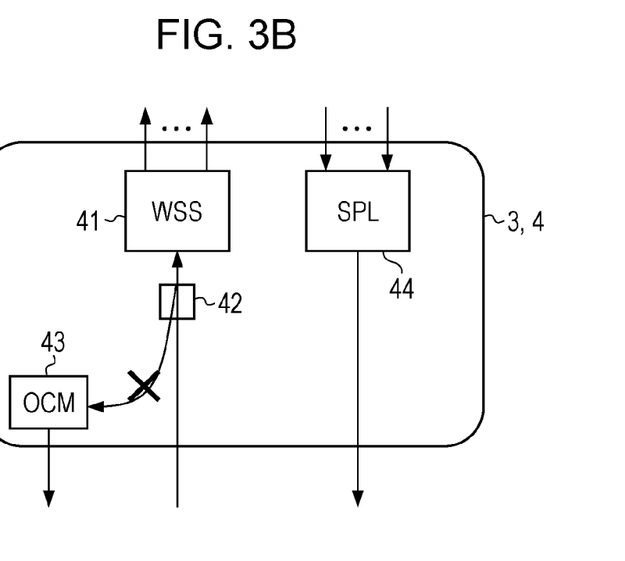

For this reason, for example, in a case where the optical modules 3 and 4 are attempted to be diverted to the optical module 5, as exemplified in FIG. 3B, the optical signals are input to the WSS 41 and the SPL 44 from directions opposite to the example illustrated in FIG. 3A, but in the case exemplified in FIG. 3B, the 1×2 optical coupler 42 does not drop the optical signal to the OCM 43 because of the structure.

Therefore, the optical modules 3 and 4 including the configuration exemplified in FIG. 3A are not directly diverted to the optical module 5.

Figure 4A:
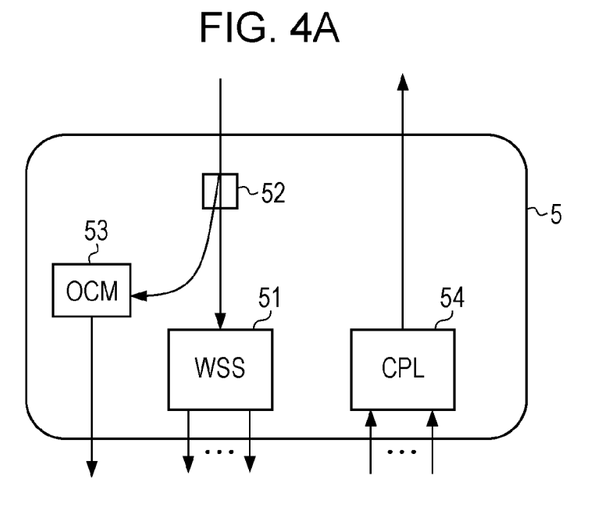
FIG. 4A and FIG. 4B illustrate configuration examples of the optical module.

As exemplified in FIG. 4A, in actuality, the optical module 5 is structured by including a WSS 51, an SPL 54, a 1×2 optical coupler 52 that performs power dropping on the optical signal input to the WSS 51, and an OCM 53 that monitors the optical signal dropped by the 1×2 optical coupler 52. The controller is notified of a monitor result of the OCM 53, for example, and the monitor result may be used for the controls on the respective optical modules 2 to 7.

Figure 4B:
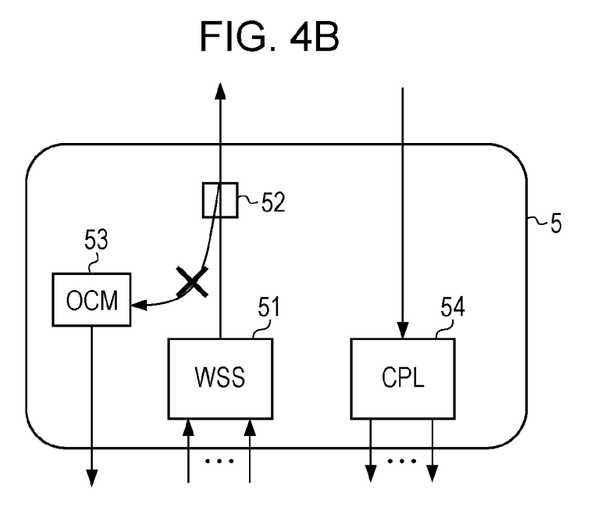

For this reason, in a case where the optical module 5 is attempted to be diverted to the optical modules 3 and 4, as exemplified in FIG. 4B, the optical signals are input to the WSS 51 and the SPL 54 from directions opposite to the example illustrated in FIG. 4A, but in the case exemplified in FIG. 4B, the 1×2 optical coupler 52 does not drop the optical signal to the OCM 53 because of the structure.

Therefore, the optical module 5 including the configuration exemplified in FIG. 4A is not directly diverted to the optical modules 3 and 4.

In view of the above, in the present example, for example, a commonly usable optical module configuration instead of the optical modules 3 to 5 is proposed. The present disclosure is not limited to the optical module configuration as the substitute of the optical modules 3 to 5 and can of course be applied to the optical module configuration as the substitute of the optical modules 6 and 7 and other optical modules, for example.

Figure 5:
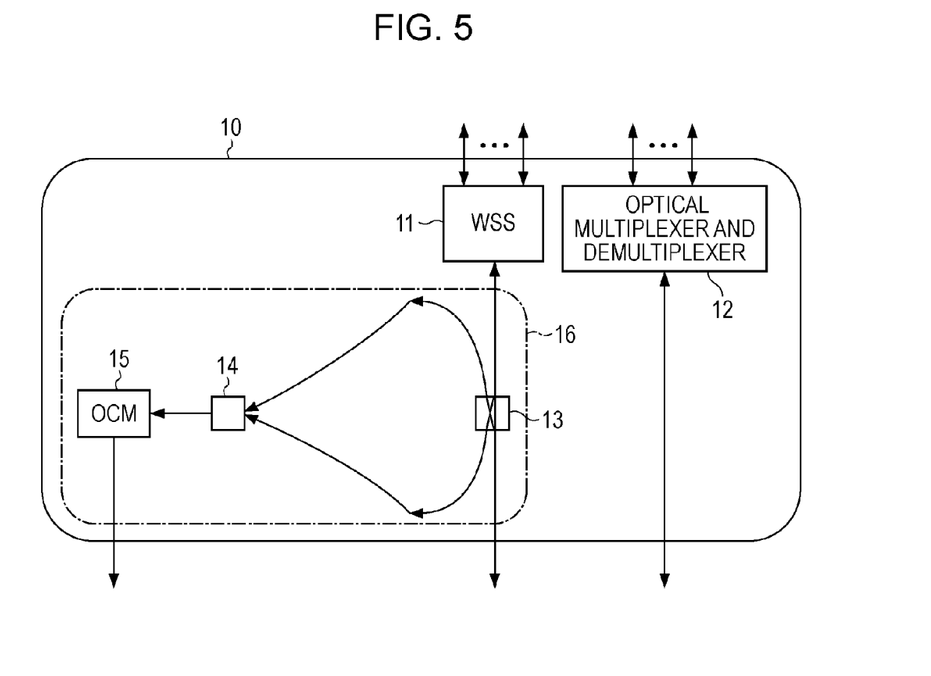
FIG. 5 illustrates a configuration example of an optical module according to an embodiment.

FIG. 5 illustrates a configuration example of an optical module according to an embodiment.

An optical module 10 illustrated in FIG. 5 includes, for example, a WSS 11, an optical multiplexer and demultiplexer 12, and a bidirectional monitor module 16 that can monitor optical powers of bidirectionally input lights. The bidirectional monitor module 16 is provided, for example, with a 2×2 optical coupler 13, a 2×1 optical coupler 14, and an OCM 15.

The WSS 11 selects the optical signals having one or plural wavelengths specified by the controller 8 among the optical signal input from one port to be output from n ports (n is an integer higher than or equal to 2) and selects the optical signals having one or plural wavelengths specified by the controller 8 among the respective optical signals input from n ports to be output from the one port. The WSS 11 can execute the selection and output operation on both the optical signals input from mutually different directions (bidirectionally operable). The WSS 11 exemplified in FIG. 5 is configured as a 1×n WSS (n is an integer higher than or equal to 2).

The WSS 11 is thus configured as a single-input multiple-output wavelength selective switch and also functions as an example of an optical switch configured as a multiple-input single-output wavelength selective switch.

The optical multiplexer and demultiplexer 12 drops the optical signals input from one port to be output from m ports (m is an integer higher than or equal to 2) and multiplexes the respective optical signals input from the m ports with each other to be output from the one port. The optical multiplexer and demultiplexer 12 can execute the dropping and multiplexing operation on both the optical signals input from mutually different directions (bidirectionally operable). The optical multiplexer and demultiplexer 12 exemplified in FIG. 5 is configured as a 1×m optical coupler (1×m optical splitter).

The optical multiplexer and demultiplexer 12 is thus configured as a single-input multiple-output optical splitter and also functions as an example of an optical multiplexer and demultiplexer configured as a multi-input single-output optical coupler.

The 2×2 optical coupler 13 drops the optical signal input to one port of the WSS 11 to two lines and also drops the optical signal output from one port of the WSS 11 to two lines. The optical signals dropped by the 2×2 optical coupler 13 are respectively guided to the input ports of the 2×1 optical coupler 14. A dropping ratio of the 2×2 optical coupler 13 is preferably set, for example, as a dropping ratio at which power loss of the main signal light is suppressed and also optical power to be input to the OCM 15 is decreased. In the example illustrated in FIG. 5, the dropping ratio of the 2×2 optical coupler 13 is set so that the ratio of the dropped light to the main signal light is approximately 1 to 9.

The 2×2 optical coupler 13 thus functions as an example of a 2×2 optical coupler that outputs the light input from a first port to a second port and drops the light input from the first port to a third port and also outputs the light input from the second port to the first port and drops the light input from the second port to a fourth port.

The WDM optical signal may be input to the 2×2 optical coupler 13. That is, the light input to the bidirectional monitor module 16 may be wavelength division multiplexed light obtained by multiplexing plural different wavelengths with each other.

The 2×1 optical coupler 14 is provided with two input ports and at least one output port, multiplexes the optical signals input to the respective input ports with each other to output the multiplexed optical signal from one output port, and guides the multiplexed optical signal to the OCM 15. In a case where the optical module 10 is diverted to the optical modules 3 to 5 of the optical add-drop multiplexer 1 exemplified in FIG. 2, the optical signal is input from one of the input ports to the 2×2 optical coupler 13 of the optical module 10. For this reason, in a case where the optical module 10 is diverted to the optical modules 3 to 5 of the optical add-drop multiplexer 1 exemplified in FIG. 2, the 2×1 optical coupler 14 of the optical module 10 outputs the optical signal input from one of the two input ports from the output port.

Figure 6A:
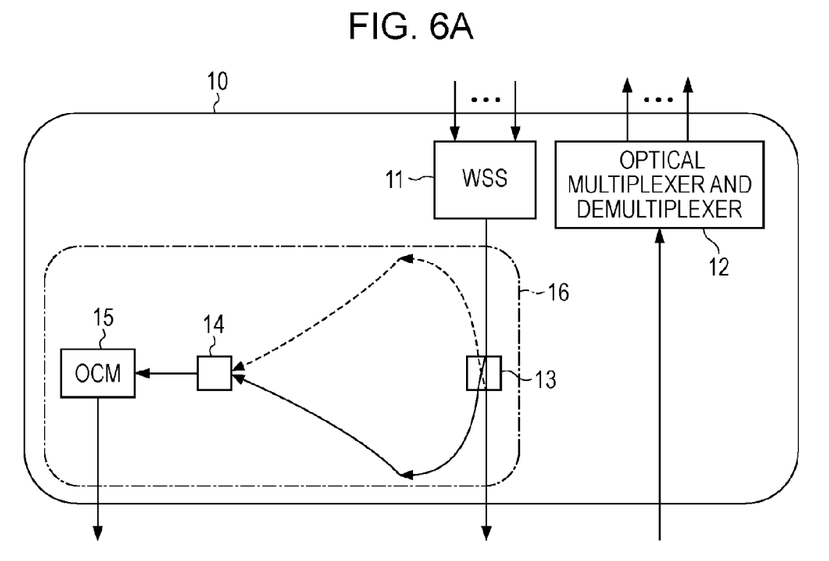
FIG. 6A and FIG. 6B illustrate examples of an operation by the optical module illustrated in FIG. 5.

For example, in a case where the optical module 10 is diverted to the optical modules 3 and 4 of the optical add-drop multiplexer 1 exemplified in FIG. 2, as exemplified in FIG. 6A, the optical signal is not dropped to a broken arrow part, and the optical signal output from one of the ports of the WSS 11 is dropped by the 2×2 optical coupler 13 and the 2×1 optical coupler 14 to be guided to the OCM 15.

Figure 6B:
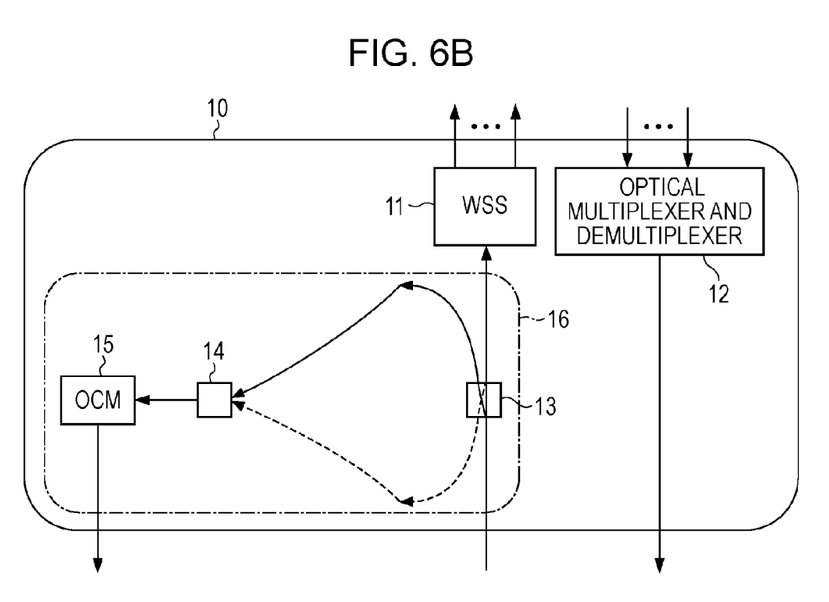

For example, in a case where the optical module 10 is diverted to the optical module 5 of the optical add-drop multiplexer 1 exemplified in FIG. 2, as exemplified in FIG. 6B, the optical signal is not dropped to a broken arrow part, and the optical signal input to one port of the WSS 11 is dropped by the 2×2 optical coupler 13 and the 2×1 optical coupler 14 to be guided to the OCM 15.

The 2×1 optical coupler 14 thus functions as an example of an optical output unit that outputs one of light that is branched (dropped) and output from the third port of the 2×2 optical coupler 13 and light that is branched (dropped) and output from the fourth port of the 2×2 optical coupler 13.

The OCM (monitor unit) 15 monitors optical power of the input optical signal. In a case where the optical signal input to the OCM 15 is WDM light, the OCM 15 can monitor the optical powers of the optical signals having the respective wavelengths. The controller is notified of a monitor result of the OCM 15, for example, and the monitor result may be used for the controls on the respective optical modules 2 to 7 and 10.

According to the optical module 10 including the above-mentioned configuration, the bidirectional monitor can be realized at inexpensive costs, and further, it is possible to realize the common use of the package. Thus, it is possible to significantly reduce the manufacturing costs for the optical module, the optical add-drop multiplexer, the optical system, and the like.

In a case where the optical powers of the optical signals input to the optical module 10 from the respective directions are largely different from each other, by appropriately setting the respective dropping ratio of the 2×2 optical coupler 13 and the 2×1 optical coupler 14, a condition with regard to a range of an input light power to the OCM 15 can be relaxed. Thus, the optical module 10 can be realized without using an expensive OCM, and in this regard too, it is possible to significantly reduce the manufacturing costs for the optical module, the optical add-drop multiplexer, the optical system, and the like.

According to the embodiment described above, the configuration of monitoring the optical power of the input light or the optical power of the output light of the WSS 11 is exemplified. For example, as in an optical module 10A exemplified in FIG. 7, the optical power of the input light or the optical power of the output light of the optical multiplexer and demultiplexer 12 may be monitored. The components assigned in FIG. 7 with the same reference symbols as FIG. 5 have similar functions as the components illustrated in FIG. 5, and a description thereof will be omitted.

The bidirectional monitor module 16 composed of the 2×2 optical coupler 13, the 2×1 optical coupler 14, and the OCM 15 can be applied in any location so long as both upstream and downstream may be set as the input directions of the signal lights.

The optical power of the input light or the optical power of the output light of the WSS 11 and the optical power of the input light or the optical power of the output light of the optical multiplexer and demultiplexer 12 may be monitored.

Figure 7:
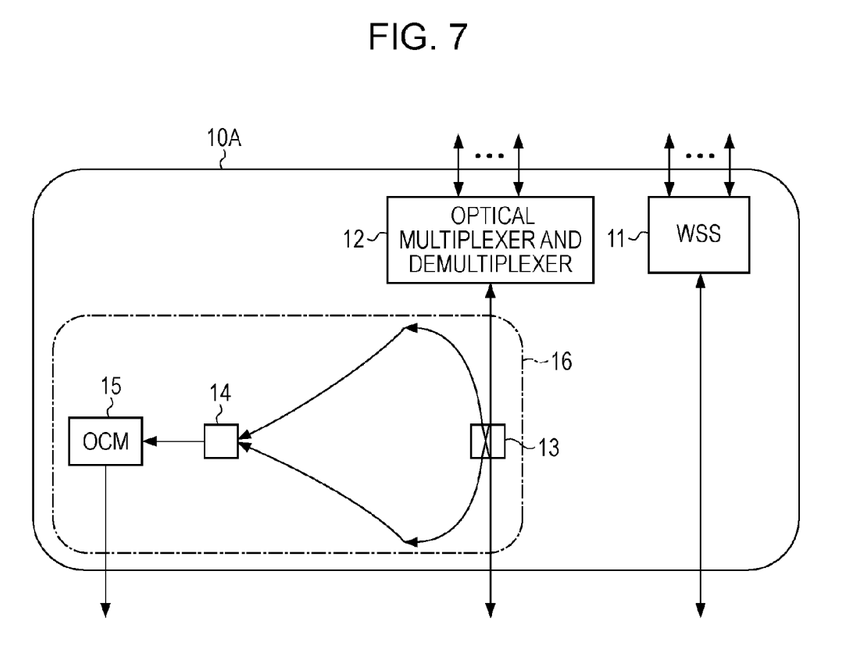
FIG. 7 illustrates a configuration example of the optical module according to a modified example.

For example, it is conceivable that the configuration exemplified in FIG. 5 and the configuration exemplified in FIG. 7 are simply used in combination, but as the number of the installed OCMs 15 is higher, the manufacturing costs for the optical module is increased.

Figure 8:
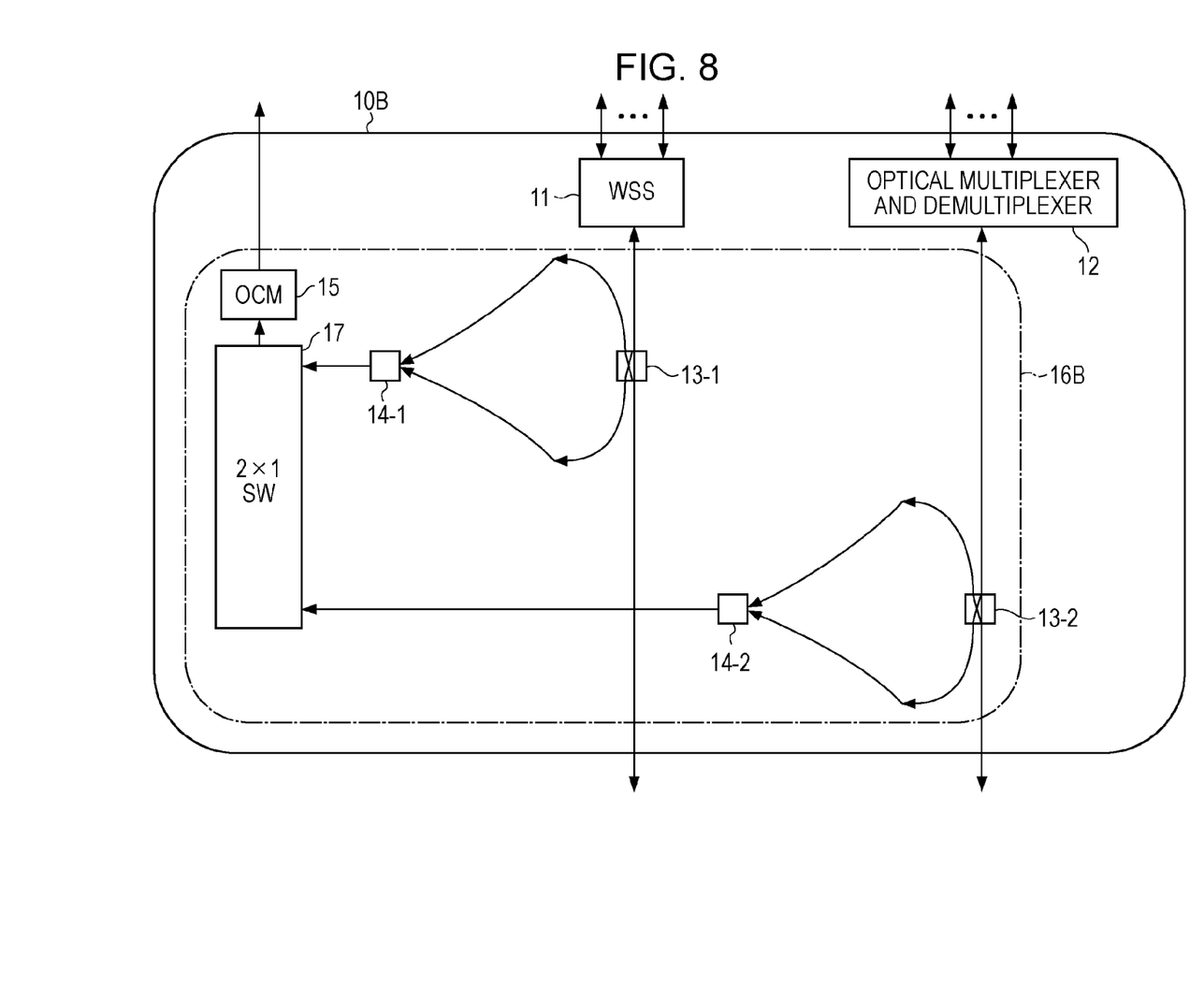
FIG. 8 illustrates a configuration example of the optical module according to another modified example.

Therefore, as illustrated in FIG. 8, an optical module 10B in the present example is provided, for example, with the WSS 11, the optical multiplexer and demultiplexer 12, and a bidirectional monitor module 16B. The bidirectional monitor module 16B is provided, for example, with 2×2 optical couplers 13-1 and 13-2, 2×1 optical couplers 14-1 and 14-2, a 2×1 optical switch (2×1 SW) 17, and the OCM 15. The components assigned in FIG. 8 with the same reference symbols as FIG. 5 have similar functions as the components illustrated in FIG. 5, and a description thereof will be omitted.

The 2×2 optical coupler 13-1 drops the optical signal input to one port of the WSS 11 and also drops the optical signal output from one port of the WSS 11. The optical signals dropped by the 2×2 optical coupler 13-1 are respectively guided to the input ports of the 2×1 optical coupler 14-1. The dropping ratio of the 2×2 optical coupler 13-1 is preferably set, for example, as a dropping ratio at which the power loss of the main signal light is suppressed, and also the optical power input to the OCM 15 is decreased. In the example illustrated in FIG. 8, the dropping ratio of 2×2 optical coupler 13-1 is set so that the ratio of the dropped light to the main signal light is approximately 1 to 9.

The 2×2 optical coupler 13-1 functions as an example of a first 2×2 optical coupler that outputs the light input from the first port to the second port and drops the light input from the first port to the third port and also the light input from the second port to the first port and drops the light input from the second port to the fourth port.

The 2×2 optical coupler 13-2 drops the optical signal input to one port of the optical multiplexer and demultiplexer 12 and also drops the optical signal output from one port of the optical multiplexer and demultiplexer 12. The light signals dropped by the 2×2 optical coupler 13-2 are respectively guided to the input ports of the 2×1 optical coupler 14-2. The dropping ratio of the 2×2 optical coupler 13-2 is preferably set, for example, as a dropping ratio at which the power loss of the main signal light is suppressed, and also the optical power input to the OCM 15 is decreased. In the example illustrated in FIG. 8, the dropping ratio of the 2×2 optical coupler 13-2 is set so that the ratio of the dropped light to the main signal light is approximately 1 to 9.

The 2×2 optical coupler 13-2 functions as an example of a second 2×2 optical coupler that outputs the light input from a fifth port to a sixth port and drops the light input from the fifth port to a seventh port and also outputs the light input from the sixth port to the fifth port and the light input from the sixth port to an eighth port.

The WDM optical signals may be respectively input to the 2×2 optical couplers 13-1 and 13-2. That is, the light input to the bidirectional monitor module 16B may be the wavelength division multiplexed light obtained by multiplexing the plural different wavelengths with each other.

The 2×1 optical coupler 14-1 is provided with two input ports and one output port, multiplexes the optical signals input to the respective input ports with each other to output the multiplexed optical signal from the output port, and guides the multiplexed optical signal to the 2×1 optical switch 17. The 2×1 optical coupler 14-2 is similarly provided with two input ports and one output port, multiplexes the optical signals input to the respective input ports with each other to output the multiplexed optical signal from the output port, and guides the multiplexed optical signal to the 2×1 optical switch 17.

The 2×1 optical coupler 14-1 functions as an example of a first optical output unit that outputs one of light that is dropped and output from the third port of the 2×2 optical coupler 13-1 and light that is dropped and output from the fourth port of the 2×2 optical coupler 13-1. The 2×1 optical coupler 14-2 functions as an example of a second optical output unit that outputs one of light that is dropped and output from the seventh port of the 2×2 optical coupler 13-2 and light that is dropped and output from the eighth port of the 2×2 optical coupler 13-2.

The 2×1 optical switch 17 is provided with two input ports and one output port and selects one of the optical signals input to the respective input ports to be output from the output port and guided to the OCM 15. The control on the 2×1 optical switch 17 may be carried out, for example, on the basis of an instruction from the network management apparatus or the controller 8.

According to the present example, while the manufacturing costs for the optical module 10B are suppressed, the optical power of the input light or the optical power of the output light of the WSS 11 and the optical power of the input light or the optical power of the output light of the optical multiplexer and demultiplexer 12 can be monitored.

Figure 9:
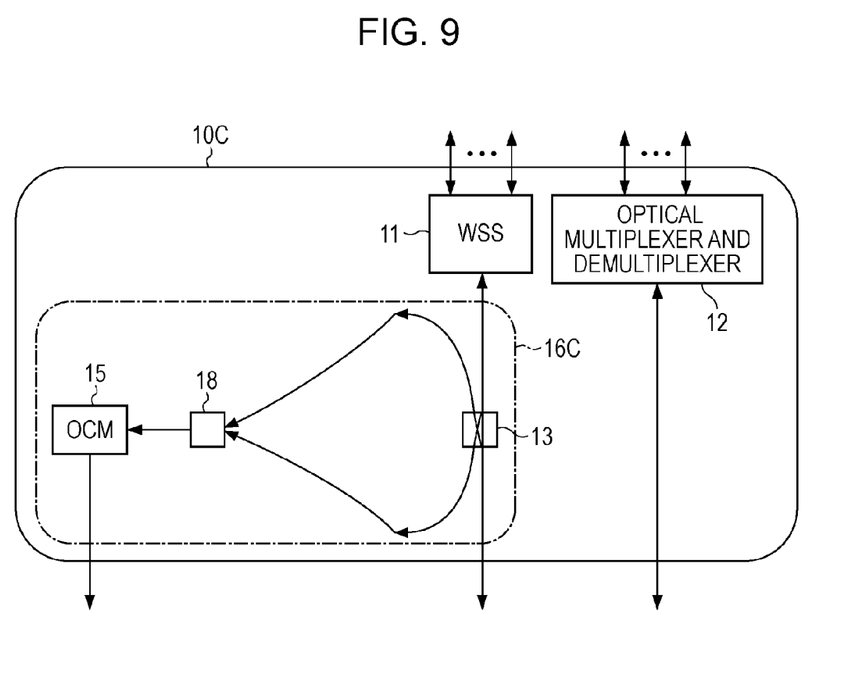
FIG. 9 illustrates a configuration example of the optical module according to another modified example.

An optical module 10C including a 2×1 optical switch 18 instead of the 2×1 optical coupler 14 in the optical module 10 exemplified in FIG. 5 may be adopted as exemplified in FIG.

9. The components assigned in FIG. 9 with the same reference symbols as FIG. 5 have similar functions as the components illustrated in FIG. 5, and a description thereof will be omitted.

The 2×1 optical switch 18 is provided with two input ports and one output port and selects one of the optical signals input to the respective input ports to be output from the output port and guided to the OCM 15. The control on the 2×1 optical switch 18 may be carried out, for example, on the basis of an instruction from the network management apparatus or the controller 8.

Since the optical power loss of the main signal light leading up to the OCM 15 can be suppressed by using a bidirectional optical module 16C including the 2×1 optical switch 18, it is possible to alleviate a restriction on a light receivable range in the OCM 15.

Figure 10:
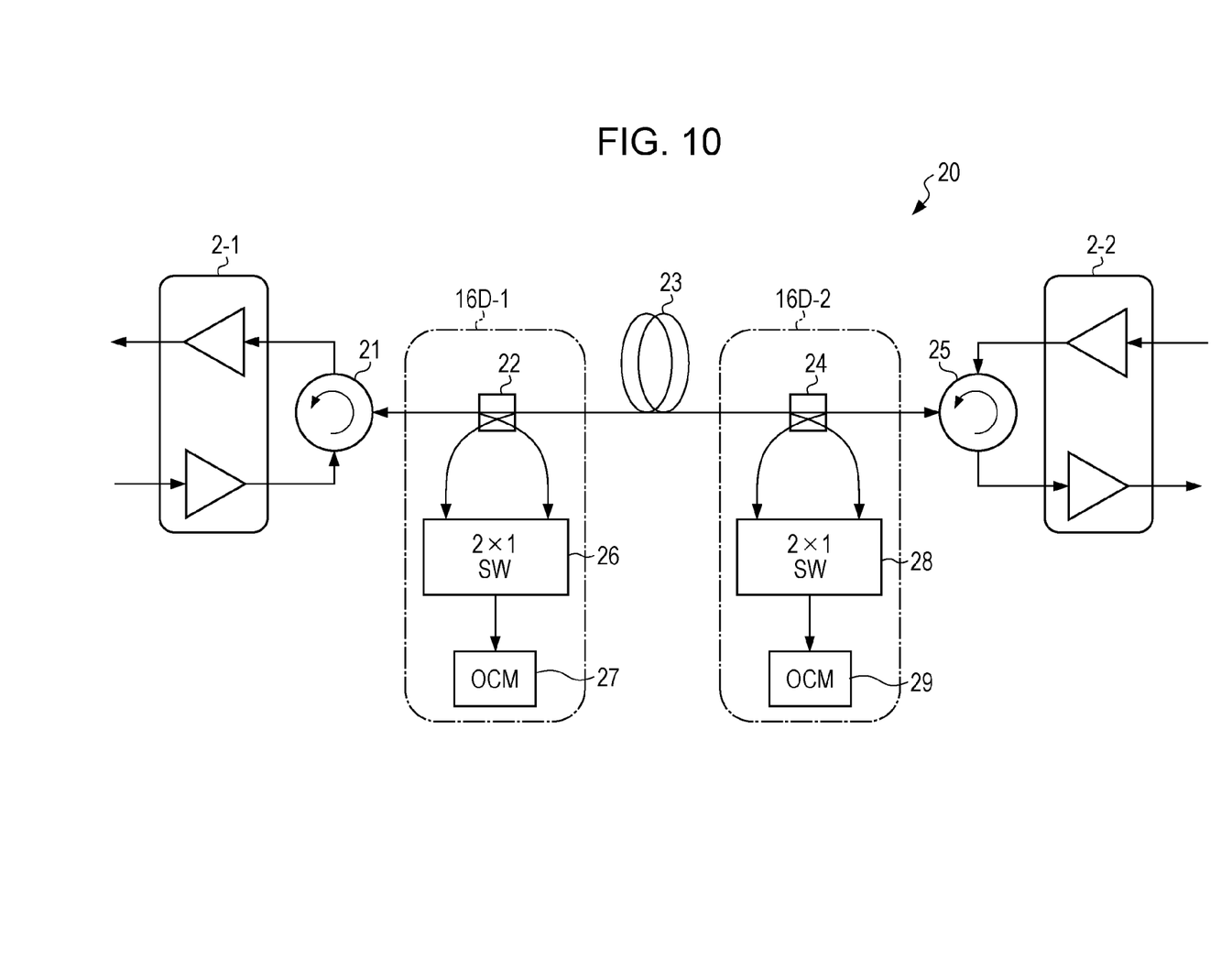
FIG. 10 illustrates a configuration example of an optical system including the optical module according to another modified example.

As exemplified in FIG. 10, a bidirectional monitor module 16D-1 (16D-2) composed of a 2×2 optical coupler 22 (24), a 2×1 optical switch 26 (28), and an OCM 27 (29) may be applied to a bidirectional WDM transmission system (optical system) 20 exemplified in FIG. 10.

The bidirectional WDM transmission system 20 illustrated in FIG. 10 is provided, for example, with the optical modules 2-1 and 2-2 provided with the plural optical amplifiers, optical circulators 21 and 25, the bidirectional optical modules 16D-1 and 16D-2, and an optical fiber amplifier 23. The bidirectional optical modules 16D-1 is provided, for example, with the 2×2 optical coupler 22, the 2×1 optical switch (2×1 SW) 26, and the OCM 27. The bidirectional optical modules 16D-2 is provided, for example, with the 2×2 optical coupler 24, the 2×1 optical switch (2×1 SW) 28, and the OCM 29.

The optical amplifiers in the optical module 2-1 amplify the optical signal in an upstream direction (right direction on a sheet surface of FIG. 10) and the optical signal in a downstream direction (left direction on a sheet surface of FIG. 10), respectively. The optical circulator 21 guides the optical signal output from the optical amplifier in the optical module 2-1 towards the upstream direction and also inputs the optical signal transmitted towards the downstream direction to the optical amplifier in the optical module 2-1.

The optical amplifiers in the optical module 2-2 similarly amplify the optical signal in the upstream direction and the optical signal in the downstream direction, respectively. The optical circulator 25 guides the optical signal output from the optical amplifier in the optical module 2-2 towards the downstream direction and also inputs the optical signal transmitted towards the upstream direction to the optical amplifier in the optical module 2-2.

The optical fiber amplifier 23 amplifies the optical signals transmitted in the upstream direction and the downstream direction. For the optical fiber amplifier 23, for example, an optical fiber doped with a rare-earth ion in a core part can be used. The representative optical fiber amplifier 23 includes, for example, an EDFA (Erbium Doped Fiber Amplifier) doped with an erbium ion in a core part.

The 2×2 optical coupler 22 drops the optical signal transmitted on the optical transmission line in the upstream direction and also drops the optical signal transmitted on the optical transmission line in the downstream direction. The optical signals dropped by the 2×2 optical coupler 22 are respectively guided to the input ports of the 2×1 optical coupler 26. The dropping ratio of the 2×2 optical coupler 22 is preferably set, for example, as a dropping ratio at which the power loss of the main signal light is suppressed, and also the optical power input to the OCM 27 is decreased. In the example illustrated in FIG. 10, the dropping ratio of the 2×2 optical coupler 22 is set so that the ratio of the dropped light to the main signal light is approximately 1 to 9.

The WDM optical signal may be input to the 2×2 optical coupler 22. That is, the light input to the bidirectional monitor module 16D-1 may be the wavelength division multiplexed light obtained by multiplexing the plural different wavelengths with each other.

The 2×1 optical switch 26 is provided with two input ports and one output port and selects one of the optical signals input to the respective input ports to be output from the output port and guided to the OCM 27. The control on the 2×1 optical switch 26 may be carried out, for example, on the basis of an instruction from the network management apparatus or the like.

The OCM 27 monitors optical power of the input optical signal. In a case where the optical signal input to the OCM 27 is the WDM light, the OCM 27 can monitor the optical powers of the optical signals having the respective wavelengths. The network management apparatus or the like is notified of a monitor result of the OCM 27, for example, and the monitor result may be used for the controls on the respective optical modules 2-1, 2-2, 16D-1, and 16D-2, the control on the excitation light supplied to the optical fiber amplifier 23, and the like.

The 2×2 optical coupler 24 drops the optical signal transmitted on the optical transmission line in the upstream direction and also drops the optical signal transmitted on the optical transmission line in the downstream direction. The optical signals dropped by the 2×2 optical coupler 24 are respectively guided to the input ports of the 2×1 optical coupler 28. The dropping ratio of the 2×2 optical coupler 24 is preferably set, for example, as a dropping ratio at which the power loss of the main signal light is suppressed, and also the optical power input to the OCM 29 is decreased. In the example illustrated in FIG. 10, the dropping ratio of the 2×2 optical coupler 29 is set so that the ratio of the dropped light to the main signal light is approximately 1 to 9.

The WDM optical signal may be input to the 2×2 optical coupler 24. That is, the light input to the bidirectional monitor module 16D-2 may be the wavelength division multiplexed light obtained by multiplexing the plural different wavelengths with each other.

The 2×1 optical switch 28 is provided with two input ports and one output port and selects one of the optical signals input to the respective input ports to be output from the output port and guided to the OCM 29. The control on the 2×1 optical switch 28 may be carried out, for example, on the basis of an instruction from the network management apparatus or the like.

The OCM 29 monitors optical power of the input optical signal. In a case where the optical signal input to the OCM 29 is the WDM light, the OCM 29 can monitor the optical powers of the optical signals having the respective wavelengths. The network management apparatus or the like is notified of a monitor result of the OCM 29, for example, and the monitor result may be used for the controls on the respective optical modules 2-1, 2-2, 16D-1, and 16D-2, the control on the excitation light supplied to the optical fiber amplifier 23, and the like.

According to the present example, the bidirectional optical monitor can be realized at inexpensive costs, and further, it is possible to realize the common use of the package. Thus, the manufacturing costs for the optical module, the optical system, and the like can be substantially reduced.

The respective configurations and the respective functions of the optical modules 10, 10A, 10B, and 10C and the bidirectional monitor modules 16, 16B, 16C, 16D-1, and 16D-2 described above may be selectively used or removed as appropriate and also may appropriately be used in combination. Thus, in order that the functions of the present disclosure described above can be realized, the respective configurations and the respective functions may be selectively used or removed as appropriate and also may appropriately be used in combination.

For example, the 2×1 optical switches may respectively be used instead of the 2×1 optical couplers 14-1 and 14-2 in the bidirectional monitor module 16B exemplified in FIG. 8.

Two OCMs that respectively monitor the output lights from the 2×1 optical couplers 14-1 and 14-2 may be used instead of the 2×1 optical switch 17 and the OCM 15 in the bidirectional monitor module 16B exemplified in FIG. 8.

Additional Notes.

Note 1. A bidirectional monitor module, comprising: a 2×2 optical coupler configured to output input light that is input from a first port to a second port and drop the input light input from the first port to a third port and also output input light that is input from the second port to the first port and drop the input light input from the second port to a fourth port; an optical output unit configured to output one of light that is dropped and output from the third port and light that is dropped and output from the fourth port; and a monitor unit configured to monitor optical power of the light output from the optical output unit.

Note 2. The bidirectional monitor module according to Note 1, wherein the optical output unit is a 2×1 optical coupler configured to multiplex input light input from one input port with input light input from another input port to be output.

Note 3. The bidirectional monitor module according to Note 1, wherein the optical output unit is a 2×1 optical switch configured to selectively output one of input light input from one input port and input light input from another input port.

Notes 3-10 are omitted.

Note 11. An optical add-drop multiplexer, comprising: one or more of optical modules comprise: a bidirectional monitor module comprises: a 2×2 optical coupler configured to output input light that is input from a first port to a second port and drop the input light input from the first port to a third port and also output input light that is input from the second port to the first port and drop the input light input from the second port to a fourth port, an optical output unit configured to output one of light that is dropped and output from the third port of the 2×2 optical coupler and light that is dropped and output from the fourth port of the 2×2 optical coupler; and a monitor unit configured to monitor optical power of the light output from the optical output unit; an optical switch configured as a single-input multi-output wavelength selection optical switch and also configured as a multi-input single-output wavelength selection optical switch; and an optical multiplexer and demultiplexer configured as a single-input multi-output optical splitter and also configured as a multi-input single-output optical coupler, wherein the bidirectional monitor module that monitors at least one of input light input to the optical switch or the optical multiplexer and demultiplexer and output light output from the optical switch or the optical multiplexer and demultiplexer, and wherein the bidirectional monitor module that monitors at least one of input light input to the optical switch or the optical multiplexer and demultiplexer and output light output from the optical switch or the optical multiplexer and demultiplexer.

Note 12. An optical system, comprising: one or more of the optical add-drop multiplexers according to note 11.

Note 13. An optical system comprising: an optical transmission line on which wavelength division multiplexed light is bidirectionally transmitted; and the bidirectional monitor module according to note 3 that monitors the wavelength division multiplexed light on the optical transmission line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A bidirectional monitor module, comprising:
a 2×2 optical coupler configured to output input light that is input from a first port to a second port and drop the input light input from the first port to a third port and also output input light that is input from the second port to the first port and drop the input light input from the second port to a fourth port;
an optical output unit configured to output one of light that is dropped and output from the third port and light that is dropped and output from the fourth port, the optical output unit being a 2×1 optical coupler configured to multiplex input light input from one input port with input light input from another input port to be output; and
a monitor unit configured to monitor optical power of the light output from the optical output unit.

2. The bidirectional monitor module according to claim 1, wherein the input light is wavelength division multiplexed light obtained by multiplexing a plurality of different wavelengths with each other.

3. The bidirectional monitor module according to claim 1, wherein a dropping ratio of the 2×2 optical coupler from the first port to the second port is higher than a dropping ratio of the 2×2 optical coupler from the first port to the third port, and a dropping ratio of the 2×2 optical coupler from the second port to the first port is higher than a dropping ratio of the 2×2 optical coupler from the second port to the fourth port.

4. A bidirectional monitor module, comprising:
a first 2×2 optical coupler configured to output input light that is input from a first port to a second port and drop the input light input from the first port to a third port and also output input light that is input from the second port to the first port and drop the input light input from the second port to a fourth port;
a first optical output unit configured to output one of light that is dropped and output from the third port and light that is dropped and output from the fourth port;
a second 2×2 optical coupler configured to output input light that is input from a fifth port to a sixth port and drop the input light input from the fifth port to a seventh port and also output input light that is input from the sixth port to the fifth port and drops the input light input from the sixth port to an eighth port;
a second optical output unit configured to output one of light that is dropped and output from the seventh port of the second 2×2 optical coupler and light that is dropped and output from the eighth port of the second 2×2 optical coupler;
a 2×1 optical switch configured to selectively output one of the light output from the first optical output unit and the light output from the second optical output unit; and a monitor unit configured to monitor optical power of the light output from the light output from 2×1 optical switch.

5. The bidirectional monitor module according to claim 4, wherein each of the first optical output unit and the second optical output unit is a 2×1 optical coupler configured to multiplex input light input from one input port with input light input from another input port to be output.

6. The bidirectional monitor module according to claim 4, wherein each of the first optical output unit and the second optical output unit is a 2×1 optical switch configured to selectively output one of input light input from one input port and input light input from another input port.

7. The bidirectional monitor module according to claim 4, wherein a dropping ratio of the first 2×2 optical coupler from the first port to the second port is higher than a dropping ratio of the first 2×2 optical coupler from the first port to the third port, and a dropping ratio of the first 2×2 optical coupler from the second port to the first port is higher than a dropping ratio of the first 2×2 optical coupler from the second port to the fourth port, and wherein a dropping ratio of the second 2×2 optical coupler from the fifth port to the sixth port is higher than a dropping ratio of the second 2×2 optical coupler from the fifth port to the seventh port, and a dropping ratio of the second 2×2 optical coupler from the sixth port to the fifth port is higher than a dropping ratio of the second 2×2 optical coupler from the sixth port to the eighth port.

8. An optical module, comprising:

a bidirectional monitor module comprising:

a 2×2 optical coupler configured to output input light that is input from a first port to a second port and drop the input light input from the first port to a third port and also output input light that is input from the second port to the first port and drop the input light input from the second port to a fourth port, an optical output unit configured to output one of light that is dropped and output from the third port of the 2×2 optical coupler and light that is dropped and output from the fourth port of the 2×2 optical coupler, the optical output unit being a 2×1 optical coupler configured to multiplex input light input from one input port with input light input from another input port to be output, and a monitor unit configured to monitor optical power of the light output from the optical output unit;

an optical switch configured as a single-input multi-output wavelength selection optical switch and also configured as a multi-input single-output wavelength selection optical switch; and an optical multiplexer and demultiplexer configured as a single-input multi-output optical splitter and also configured as a multi-input single-output optical coupler, wherein the bidirectional monitor module that monitors at least one of input light input to the optical switch or the optical multiplexer and demultiplexer and output light output from the optical switch or the optical multiplexer and demultiplexer.

* * * * *